(12) United States Patent
Devir et al.

(10) Patent No.: US 11,803,620 B2
(45) Date of Patent: Oct. 31, 2023

(54) SYSTEMS AND METHODS FOR IDENTIFYING A CONTENT RECEIVING DEVICE

(71) Applicant: Synamedia Limited, Staines upon Thames (GB)

(72) Inventors: Michal Devir, Haifa (IL); Lev Reitblat, Ma'ale Adumim (IL); Steve Epstein, Hashmonaim (IL)

(73) Assignee: SYNAMEDIA LIMITED, Staines upon Thames (GB)

( * ) Notice: Subject to any disclaimer, the term of this patent is extended or adjusted under 35 U.S.C. 154(b) by 127 days.

(21) Appl. No.: 16/875,909

(22) Filed: May 15, 2020

(65) Prior Publication Data

US 2021/0357482 A1 Nov. 18, 2021

(51) Int. Cl.
*G06F 21/16* (2013.01)
*H04N 21/8358* (2011.01)

(52) U.S. Cl.
CPC ......... *G06F 21/16* (2013.01); *H04N 21/8358* (2013.01); *G06F 2221/0737* (2013.01)

(58) Field of Classification Search
CPC ... G06F 21/10; G06F 21/16; G06F 2221/0737
See application file for complete search history.

(56) References Cited

U.S. PATENT DOCUMENTS

| | | | |
|---|---|---|---|
| 2009/0183258 A1* | 7/2009 | Isogai | G06F 21/16 706/54 |
| 2010/0284530 A1* | 11/2010 | Perez-Freire | H04L 9/32 380/1 |
| 2010/0287614 A1* | 11/2010 | Perez-Freire | H04L 9/32 726/22 |
| 2014/0325550 A1 | 10/2014 | Winograd et al. | |
| 2015/0033026 A1 | 1/2015 | Roelse et al. | |
| 2016/0080831 A1* | 3/2016 | Hunacek | H04N 21/63345 725/31 |
| 2016/0217545 A1* | 7/2016 | Diehl | G06T 1/0021 |
| 2020/0226233 A1* | 7/2020 | Penugonda | G06F 21/16 |
| 2020/0358602 A1* | 11/2020 | Huang | H04L 63/08 |
| 2021/0357482 A1* | 11/2021 | Devir | H04N 21/2541 |

OTHER PUBLICATIONS

G. Tardos. Optimal probabilistic fingerprint codes. In ACM Symposium on Theory of Computing (STOC) 2003, pp. 116-125, 2003.

(Continued)

*Primary Examiner* — Dao Q Ho
(74) *Attorney, Agent, or Firm* — FINNEGAN, HENDERSON, FARABOW, GARRETT & DUNNER LLP

(57) ABSTRACT

A method for identifying from among network-connected devices a particular device likely associated with a theft of distributed content includes obtaining content, the content having been distributed from a particular one of the network-connected devices, identifying in the obtained content anti-collusion codes, and determining the particular one of the network-connected devices is likely associated with the theft of distributed content when an aggregated probability calculated using the identified anti-collusion codes is equal to or exceeds a predetermined threshold.

20 Claims, 11 Drawing Sheets

(56) References Cited

OTHER PUBLICATIONS

B. Skoric, S. Katzenbeisser, and M. Celik. Symmetric Tardos fingerprinting codes for arbitrary alphabet sizes. Designs, Codes and Cryptography, 46(2):137-166, Feb. 2008.

J. J. Oosterwijk, B. Skoric, and J. Doumen. A capacity-achieving simple decoder for bias-based traitor tracing schemes. Cryptology ePrint Archive, Report 2013/389, 2013. http://eprint.iacr.org/.

T. Laarhoven. Capacities and capacity-achieving decoders for various fingerprinting games. In ACM Workshop on Information Hiding and Multimedia Security (IH&MMSec), Jun. 2014.

T. Furon. Binary Tardos Codes and Zero-bit Watermarking—HAL-Inria, Dissertation. 2018.—https://hal.inria.fr/tel-01932766/document.

T. Laarhoven, J. Doumen, P. Roelse, B. Skoric, and B. de Weger. Dynamic Tardos traitor tracing schemes. IEEE Transactions on Information Theory, 59(7):4230{4242, 2013.

European Search Report, European Application No. 21172805.0-1209 for Synamedia Limited, dated Sep. 13, 2021 (9 pages).

\* cited by examiner

170B

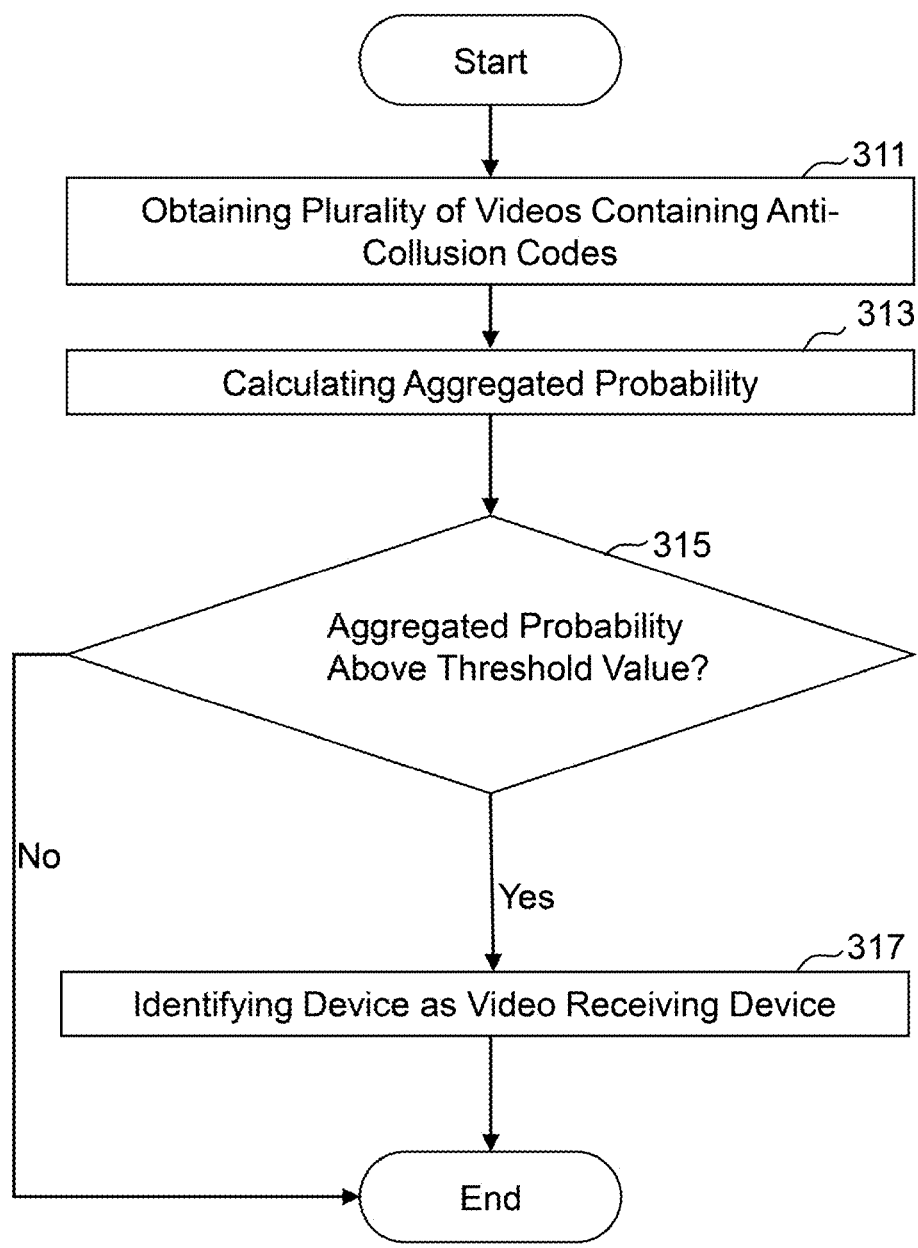

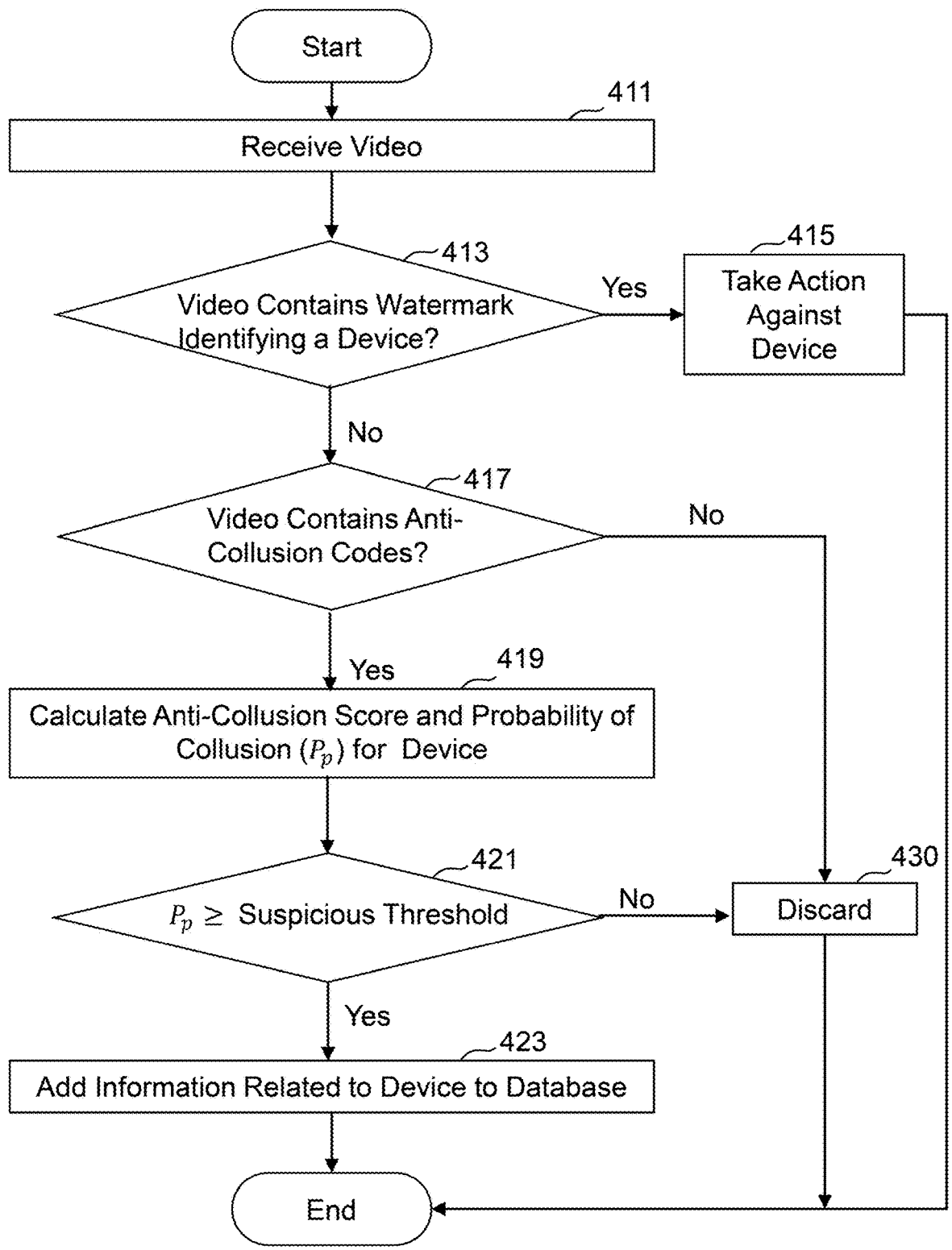

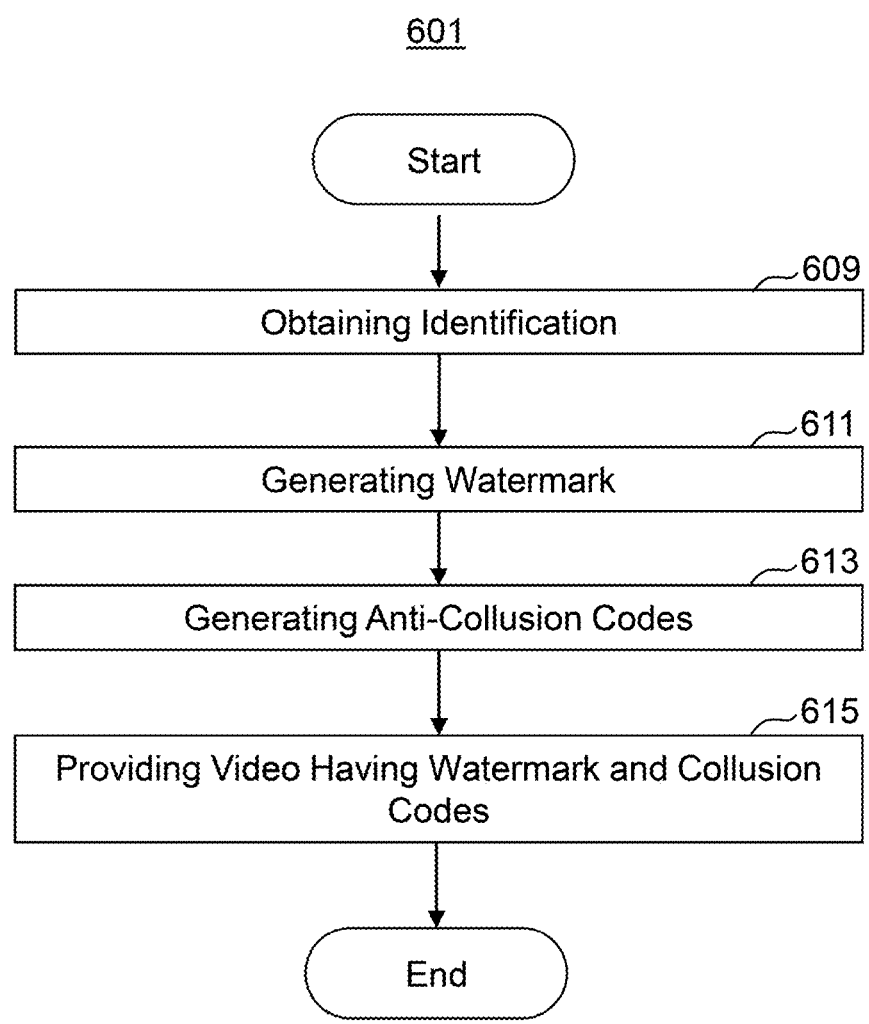

SYSTEMS AND METHODS FOR IDENTIFYING A CONTENT RECEIVING DEVICE

TECHNICAL FIELD

The present disclosure relates to systems and methods for distributing content and for identifying pirated content, and more particularly, to systems and methods for distributing and identifying content containing anti-collusion codes and digital watermarks.

BACKGROUND

Digital watermarking is the method of embedding data into digital multimedia content. The watermarking may be used to verify the credibility of the content or to recognize the identity of the digital content's consumer. Digital watermarking may be used for copyright protection, and/or for tracking a pirated content distributed by an unauthorized distributor. In some cases, to render a digital watermark ineffective, distributers of a pirated content utilize a collusion attack. The collusion attack may combine several media copies together to produce a new copy. For example, video frames of videos distributed to different consumers may be combined to produce a new video copy. To deter collusion attacks, anti-collusion codes may be incorporated into multimedia content, and when such codes are detected in a copy of the multimedia content, these codes may be used to determine a probability that a given consumer of the multimedia content is involved in a collusion attack.

Using anti-collusion codes and digital watermarking enables distributors of multimedia content to embed a digital identification into multimedia content, where the content may include digital images, video data, and audio data. Anti-collusion codes and digital watermarks may be imperceptible to humans reviewing the content but can be detected by computers, routers, and various data processing devices. For instance, a digital watermark and anti-collusion codes may be easily embedded into a copy of a confidential document or a copy of a video streaming signal, as the copy is being created and/or distributed.

The data contained in a digital watermark may include identifiable information about a recipient, such that a copy of the multimedia content that is intentionally leaked and distributed may be traced back to the recipient. Additionally, distributors of multimedia content can use network detectors to check for digital watermarks within documents, images, video, and audio data, and to disrupt attempts to upload the watermarked content to the web or forwarding it in an email. Similarly, as describes above, data contained in anti-collusion codes extracted from multimedia content marked with such anti-collusion codes may be used to determine a probability that the multimedia content was distributed to a given recipient, thus allowing distributors of multimedia content to disrupt attempts to illegally share content that contains the anti-collusion codes.

Identifying recipients of multimedia content based on embedded watermarks and anti-collusion codes faces many challenges. For example, a large number of anti-collusion codes may be required to effectively determine one or more recipients of multimedia content when the content is modified via a collusion attack.

The disclosed systems and methods for distributing and identifying content containing anti-collusion codes and digital watermarks address one or more of the problems set forth above and/or other problems in the prior art.

SUMMARY

Consistent with a disclosed embodiment, a method for identifying from among network-connected devices a particular device likely associated with a theft of distributed content is provided. The method includes obtaining content, the content having been distributed from a particular one of the network-connected devices, identifying in the obtained content anti-collusion codes, and determining the particular one of the network-connected devices is likely associated with the theft of distributed content when an aggregated probability calculated using the identified anti-collusion codes is equal to or exceeds a predetermined threshold.

Consistent with another disclosed embodiment, a system for identifying from among network-connected devices a particular device likely associated with a theft of distributed content is provided. The system includes a memory storing instructions and a processor executing instructions for performing operations. The operations may include obtaining content, the content having been distributed from a particular one of the network-connected devices, identifying in the obtained content a subset of the distributed content containing anti-collusion codes, and determining the particular one of the network-connected devices is likely associated with the theft of distributed content when an aggregated probability calculated using the identified anti-collusion codes is equal to or exceeds a predetermined threshold.

Consistent with another disclosed embodiment, a system for distributing content to user devices and for identifying from among network-connected devices a particular device likely associated with a theft of distributed content is provided. The system includes a processor that may be configured to perform distributing operations. The distributing operations may include obtaining an identification associated with a network connected device configured to receive a content, generating a watermark reflecting the device identification, generating anti-collusion codes for the content, and providing the content by embedding in the content the watermark, wherein the watermark is not visually observable during playback of the content containing the watermark, and the anti-collusion codes. Further, the processor of the system may be configured to perform identifying operations, which may include obtaining content, the content having been distributed from a particular one of the network-connected devices, determining whether at least some of content of the obtained content includes a watermark having a user device identification, identifying in the obtained content a subset of the distributed content containing anti-collusion codes, and determining the particular one of the network-connected devices is likely associated with the theft of distributed content when an aggregated probability calculated using the identified anti-collusion codes is equal to or exceeds a predetermined threshold.

Further, consistent with disclosed embodiments for the method described above, a non-transitory computer readable medium is provided. The non-transitory computer readable medium includes instructions that, when executed by at least one processor, cause the at least one processor to perform operations of the method discussed herein.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings:

FIG. 3A is an example process of identifying a content receiving device, consistent with disclosed embodiments.

FIG. 4A is an example process for identifying a device as a possible content receiving device, consistent with disclosed embodiments.

FIG. 6A is an example process for marking content with digital marks, consistent with disclosed embodiments.

DETAILED DESCRIPTION

Figure 1A:
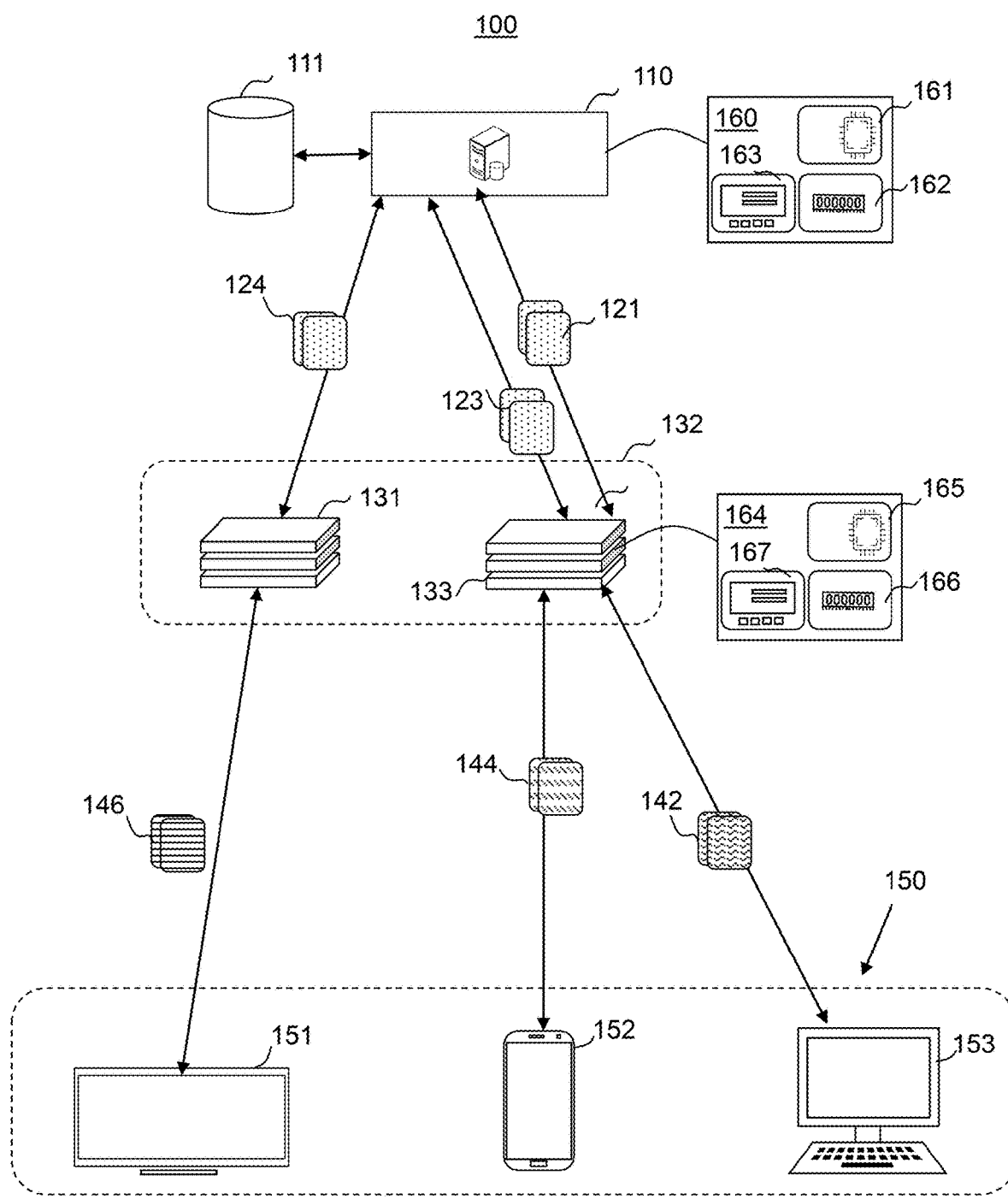
FIG. 1A is an example system for streaming and marking content with digital marks, consistent with disclosed embodiments.

Reference will now be made in detail to exemplary embodiments discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments relate to systems and methods for identifying a device that received digitally marked content, such as multimedia content. Additionally, the disclosed embodiments relate to systems and methods for distributing digitally marked content to user devices. The multimedia content can include video, image, audio data, 3D graphical objects, texts, software codes, network streams, XML data, or any other suitable binary or text data. For digitally marking multimedia content, any suitable computer-based models may be used, such as, for example, machine-learning techniques.

Digital marking may include any suitable digital markings for marking multimedia content. For example, the digital markings may include anti-collusion codes or any other suitable digital watermarks that may be undetectable during playback of the multimedia content. In many cases, digital watermarking (herein, also referred to as watermarking) may be a first line of defense for combating multimedia content piracy. Since, in many cases, the multimedia content may be a video, for the brevity of description, the term "video" may be used for describing multimedia content with the understanding that methods and systems described in this disclosure may be equally applied for other suitable multimedia content.

In an example embodiment, the system for watermarking content may be a content processing system which may be a computer system that includes a processor and a memory for storing instructions. The content processing system may obtain identifiable information associated with a user device (also referred to as a device identification) configured to receive content and generate a digital watermark reflecting the identification of the device. In an example embodiment, the identifiable information associated with the user device may include a machine code, an IP address, a type of device (e.g., a laptop, a smartphone, a router, etc.), a location of the device (e.g., GPS coordinates, address of the location, and the like). In some embodiments, the content processing system may obtain identifiable information associated with an account of the user that is used for the authentication of the user device. The identifiable information associated with the user account may be a user ID, a user email, a user name, an image of the user, a user address, a user financial information (e.g., a user credit card number, a bank account number, and the like) or any other suitable identifiable information related to the user.

The content processing system may be configured to generate a digital watermark that is associated with the identification of a user device or the identifiable information related to an account of the user. The watermarked content reflects the receiver (e.g., a user receiving the multimedia content, a device for receiving the content, or a user account for receiving the content) of the content, and the receiver of the content can be identified based on the detected watermark within the content. The content processing system may generate a digital watermark using any suitable technique (e.g., using a machine-learning model, such as, for example, a neural network). In an example embodiment, the content processing system may receive an identification for a user device (e.g., a user device MAC address) and associate a watermark with the identification. The association of the watermark and the identification may be stored in a database for a future reference. When content is a video, the content processing system may output a watermark that may be a bit data embedded in several frames of the video, audio soundtrack for the video, or metadata for the video.

In various embodiments, watermarking multimedia content may be head-end based. The head-end based watermarking refers to an approach in which multiple copies of the multimedia content are generated with each segment copy including a different watermark. A segment of the multimedia content may encode one bit (which means there can be two different copies of each segment). For example, a first copy of a segment may contain bit "0", and a second copy of a segment may contain bit "1". When multimedia content is requested by a user device, the device may receive a unique combination of segments from the two copies of the content. In an example embodiment, the segments may be determined by a unique manifest file transmitted to a user device, with a unique combination of segments reflecting the identity of the user device.

It should be noted that the content processing system may include any other suitable information that may be associated with the watermark and retrieved based on the watermarked content using a specialized application. For example, the information associated with the watermark may include transmission-related information (e.g., time of transmission, network information, encoding type for the content, information related to the content processing system, devices used to facilitate transmission such as routers, edge computing systems, processors, memory devices, servers, and the like). Additionally, the information associated with the watermark may be related to the content. For example, the information may include the content classification (e.g., video, image, audio, software, code, script, article, etc.), the keywords associated with the content (e.g., a title of a video if the content is a video), the size of the media, or any other suitable characteristics of the media (e.g., the duration of the media for the media being an audio or video), a public key associated with the content processing system that can be used to encrypt messages received by the content processing system, and the like.

The content processing system may include more than one watermark in the content. For example, when watermarking multimedia content containing multiple media (e.g., a video containing video frames and an audio signal), a first watermark may be embedded into one or more video frames and a second watermark may be embedded into an audio signal. It should be understood that any number of watermarks containing any suitable information may be used to watermark the multimedia content. After including the digital watermark, the content processing system is configured to transmit the watermarked content to the user device for the playback. For example, the content processing system may include software that, when executed by a processor, performs internet-related communication (e.g., TCP/IP) and transmits the watermarked content to the user device.

In various embodiments, the digital watermark may be embedded in the multimedia content and may not be visually observable during playback/display of the watermarked multimedia content. For example, the digital watermark may be a single bit (or few bits) placed within an image frame of the multimedia content. In an example embodiment, a digital watermark may be bit data placed within an audio signal of multimedia content containing audio. The embedded digital watermark may enable tracking of transmission of the watermarked content to a user device, as it contains identifiable information associated with the user device.

Depending on the application of digital watermarking, the watermarking system is designed to address the trade-off problem resulting from competition among watermark capacity, robustness, watermark imperceptibility, and computational costs associated with the digital watermarking.

The content processing system may be a computing system that is a part of a network system for distributing content. An example network system 100 is shown in FIG. 1A. Network system 100 may include a server 110, a set of edge computing systems 132 communicatively connected to server 110 and user devices 150. FIG. 1A shows, for example, an edge computing system 131 connected to a device 151 and an edge computing system 133 connected to a device 152 and a device 153. In an example embodiment, FIG. 1A shows a content processing system 160 as a part of server 110. System 160 may include one or more processors 161, a memory 162 for storing programming instructions, and an interface 163 for modifying programming instructions and controlling various parameters of system 160. In some embodiments, a content processing system may be part of an edge computing system. For example, a content processing system 164 is shown to be a part of system 133. System 164 may include one or more processors 165, a memory 166 for storing programming instructions, and an interface 167 for modifying programming instructions and controlling various parameters of system 164.

In some embodiments, content processing system 160 (or system 164) may communicate with a database, such as a database 111, as shown in FIG. 1A, for storing content, including, for example, the multimedia data, and any other relevant data related to processing multimedia content. For example, other relevant data may include profile data of various users of system 100 that can include user multimedia preferences, user authentication information, or any other user related information (e.g., links to other users, and the like). As described above, content processing system 160 and 164 may include at least one processor (e.g., processors 161 and 165) for performing various tasks, such as receiving communication data from edge computing system 133, decrypting the communication data, for cases when the data is encrypted, analyzing the communication data (e.g., determining what type of multimedia is being requested by a user device, authenticating the user device, and the like), retrieving multimedia content requested by the user device, and processing the content. Processing the retrieved content may include watermarking the content, including embedding anti-collusion codes in the content, encoding and/or encrypting the content, and transmitting the processed content to one or more edge computing systems. Alternatively, the content may be transmitted to one or more edge computing systems (e.g., system 133), and system 133 may process the content, as described above. In some cases, some of the steps of content processing may be done by system 160, and other steps may be done by system 164. For example, system 160 may watermark the content and embed anti-collusion codes in the content, while system 164 may encode the content.

In an example embodiment, as shown in FIG. 1A encrypted communication data 121 is communicated to server 110 that may include a request for multimedia content by device 153. Server 110 may retrieve multimedia content 123, encode and encrypt content 123 and communicate content 123 to edge computing system 133. Edge computing system 133 may decrypt and decode at least a portion of the encrypted and encoded content 123, generate anti-collusion codes and a digital watermark, and include the anti-collusion codes and the digital watermark into the decrypted and uncompressed portion of the content. In one embodiment, system 133 may communicate with device 153 using data packages 142 to obtain identifiable information (e.g., device identification, account-related information, or user-related information as described above) and include the identifiable information into the digital watermark. FIG. 1A shows content 123, 124 that are used for data exchange between server 110 and edge computing systems 131 and 133, and data packages 146, 144, and 142 used for exchanging data between edge computing systems 132 and user devices 150.

Figure 1B:
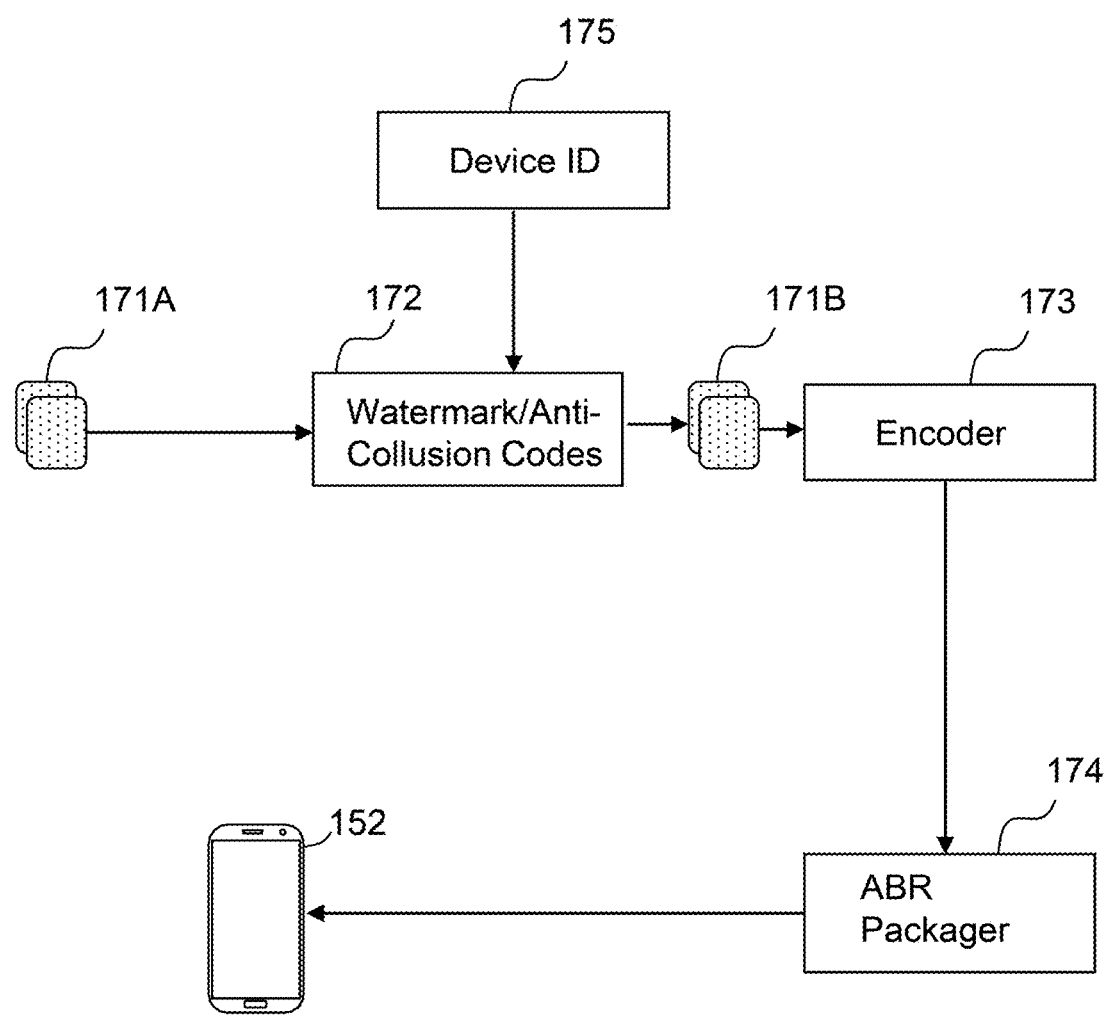
FIGS. 1B and 1C show example diagrams describing processing multimedia content, consistent with disclosed embodiments.

An example embodiment of a process 170A for processing multimedia content is shown in FIG. 1B. Content 171A may be processed by a computer-based software application 172 configured to watermark content 171A and embed anti-collusions codes in content 171A. As an input, application 172 may take a device identification number (a device ID 175, as shown in FIG. 1B), as well as content 171A. For example, device ID 175 may be used as data to be embedded into a watermark for content 171A. Application 172 may process content 171A by watermarking the content and embedding anti-collusion codes in content 171A, and output processed content 171B. Content 171B may be encoded by an encoder 173, and after being encoded, may be packaged by an adaptive bitrate (ABR) packager (e.g., just-in-time packager), such as an ABR packager 174. In an example embodiment, encoder 173 may generate several ABR streams, and ABR packager 174 may provide sequentially arranged segments of ABR streams to user device 152 via a content distribution network.

Figure 1C:
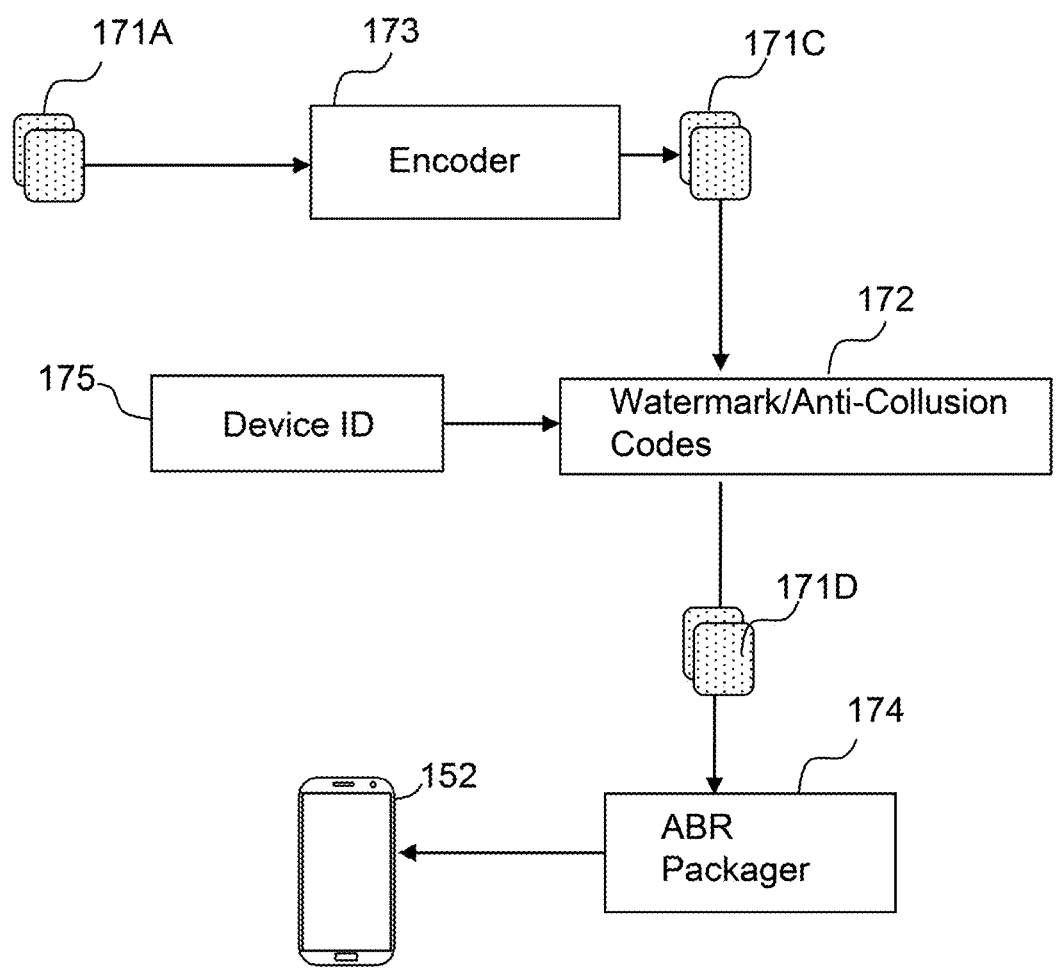

It should be noted that in some cases, process 170A may be altered, as shown in FIG. 1C. by a modified process 170B. For example, content 171A may be first encoded by encoder 173, and encoded content 171C may be processed by application 172. As before, application 172 may take as input device ID 175. In some cases, application 172 may partially decode the content 171C in order to watermark content 171C and to embed anti-collusion codes into content 171C resulting in a processed content 171D. Content 171D may then be packaged by ABR packager 174. In an example embodiment, ABR packager 174 may re-encode content 171D to generate several ABR streams to provide sequentially arranged segments of ABR streams to user device 152 via a content distribution network.

Aspects of the present disclosure relate to a system and method for identifying a receiving device. In an example embodiment, the receiving device may be any of user devices 150, as shown in FIG. 1A configured to receive a video. A video receiving device may include a unique device identification, which may be any suitable device identification as described above.

In some embodiments, system 160 of server 110 (or system 164) may be configured to identify a video receiving device by analyzing various videos collected (also referred to as harvested) by system 160. In an example embodiment, system 160 (or system 164) may be configured to include a web crawler (e.g., an Internet bot) that may systematically browse the World Wide Web or any suitable network, peer-to-peer communications, and the like to obtain various video files being distributed by accounts of various users of being shared/exchanged by various users. System 160 (or system 164) may be configured to collect videos for a corresponding user account (or related to a particular video-distributing party) and analyze the videos to determine which device (herein referred to as a video receiving device) may be involved in the distribution of such videos. Various aspects of a method of determining the video receiving device are further described below.

Identifying a video receiving device by analyzing one or more videos may include identifying a watermark within the one or more videos, and determining a device identification from the watermark. As described above, digital watermarking may be a first line of defense for combating multimedia content piracy, and may allow for the determination of the video receiving device. However, a collusion attack may prevent determining a watermark contained within a video. A collusion attack, as described above, may include combining multiple copies of the same video that was distributed to different user devices, so as to produce a new copy of the video. The operations used during the collusion attack may include but are not limited to averaging of data in video frames of one or more video copies, creating a new copy of the video by assembling video data from multiple video copies, and the like. A collusion attack may be effective in altering watermarks presented in various video copies such that the altered watermarks may not be extracted from the new copy of the video obtained using the collusion attack. A collusion attack may be characterized by a number of colluders engaging in the collusion attack. For example, a number of video copies that are used to create a new video copy may correspond to the number of colluders. Since the number of colluders is typically not known, when determining whether a collusion attack has happened, a method for identifying a video receiving device may assume a suitable number of colluders (e.g., two, three, four, five, six, seven, eight, nine, ten, eleven colluders, and the like). In some cases, system 160 (or system 164) may be configured to analyze hardware (which may be determined by analyzing the pirated video) that may be used by a pirate (or a group of pirates) to determine a possible number of colluders (e.g., the number of colluders may correspond to a number of HDMI ports available for the hardware).

As described above, in order to deal with the collusion attacks, anti-collusion codes were invented. The anti-collusion codes may correspond to a particular type of watermark payload that may allow identifying users involved in the collusion attack. For example, the anti-collusion codes may be used for calculating a score, and then for calculating the probability of a user who has this score to be part of the pirate coalition. The anti-collusion codes may include generating a new identification (ID) for each user device and/or each video distributed to each user device. Such ID may also be referred to as a codeword. In an example embodiment, a codeword may be retrieved from a pirated copy, and a score and a corresponding probability may be calculated for a video receiving device based on the codeword. The probability can be calculated either by theoretical equations or by using empirical results based on a Monte Carlo simulation, which in practice may give better results (meaning that a shorter code is required in order to be resistant against a certain number of colluders, for a given population size).

In some cases, if a score for a video (or several videos) for a user device does not indicate with a sufficiently high probability that the user device is engaging in pirating the video (or several videos), the user device may be ignored. Alternatively, the device may be identified as a pirating device. Additionally, a user device may be determined to be a suspicious device depending on the value of the score for a video (or several videos) for the user device. When a device is determined to be suspicious, the additional anti-collusion characters may be used (such characters may be obtained from other video segments) to further improve the determination of the probability that the user device is a pirating device.

One way to probabilistically (i.e., with some measurement of assurance) determining that a video is distributed by a specific video receiving device (i.e., the video receiving device is involved in pirating the video) may be obtained using anti-collusion codes, such as, for example, Tardos codes. In example embodiments, a digital watermark (that in some cases may be generated to include anti-collusion codes) may include a plurality of characters (including any suitable characters such as digits, letters, and the like) that may be inserted into multimedia content in any suitable way. For example, the watermark data may be bit data such as zeros and ones inserted into video, audio, image, or binary data. In an example embodiment, the bit data may be inserted into frames of a video. Alternatively, the data may be inserted for a video segment that may contain multiple frames. For example, the data may be inserted into the first frame of a video segment. In some cases, a single bit (e.g., "0" or "1") may be inserted in a frame of a video. The number of characters (or bits) inserted into video frames may be referred to as a code length, a payload length, or a codeword (the codeword being all the characters inserted in a given video). In various embodiments, the code length may be desired to be as short as possible while still allowing for determining a probability that the video is distributed by a specific video receiving device.

In an example embodiment, a choice of which character (e.g., "0" or "1") is inserted for a particular video segment is determined by a suitable probability value. For example, insertion of code "1" for a particular video segment i for a video copy j distributed to a user device J may be given by a probability value $p_i$, and insertion of code "0" for segment i and a video copy j (distributed to device J) may be given by a probability value $1-p_i$. For instance, for video copy j, if $p_i=0.3$, then a random number generator may be configured to generate "1" with a probability 0.3 and "0" with a probability of 0.7 for the ith segment. The generated anti-collusion code then may be inserted into multimedia content as a watermark.

In various embodiments, the digital watermark may be embedded into a video using either a "standard" approach or an "anti-collusion" approach. When using a standard approach, for each user device with the user device ID, a digital watermark may be embedded one bit after another, with each bit embedded in a segment of a video that is distributed to the user device. For example, for the ith segment, a process of embedding a digital watermark may include embedding a value of the ith bit of the user device ID (i.e., using a head-end based watermarking approach discussed above, when the bit value is "0" we use the first copy of a video with the embedded bit "0", and when the bit value is "1", we use the second copy of this segment, in which "1" is embedded).

In some cases, a process of embedding the digital watermark may include encoding the same bit in more than one segment (e.g., two segments). In such a case, the process may include embedding the ith bit of the ID in the ith and ith+1 segments. Additionally, or alternatively, for digital watermarking robustness, it may be preferred to embed the same watermark characters into multiple frames of a video to ensure that watermark may be identified even when some of the video frames are removed in a pirated video.

When using an anti-collusion approach, for each video a process of embedding a digital watermark may include defining a set of probabilities $p_i$ for each ith segment, and determining the bit value "0" or "1", based on the probability value. In an example embodiment, the bit values "0" and "1" form a codeword for which a user device ID may be associated. Similar to a standard approach described above, in some cases, a process of embedding the digital watermark may include encoding the same bit in more than one segment. In various embodiments, anti-collusion codes may be essentially unique for a given video received by a given device, as the probability of two devices having the same anti-collusion code for a given video is negligibly small. Also, if, in rare cases, any two anti-collusion codes are the same, a seed value that is used for generating anti-collusion characters may be modified to ensure that anti-collusion codes are different. Additionally, besides embedding anti-collusion codes, a code for identifying a user device may be embedded before an anti-collusion code. Such a code may be used for cases when there is no collusion, and a pirate may be determined by identifying this code.

For a motivation, one can observe that having "1" for segment i in a pirated copy makes a device J that receives video copy J more suspicious when a video copy j has "1" for segment i, and less suspicious otherwise. Clearly, having a "1" in the pirated copy for segment i where only a few devices that received video copies that have that digit (i.e., digit "1" for a corresponding segment i of video copy j) makes these videos even more suspicious. In an example embodiment a choice for probability value $p_i$ may be biased towards values close to zero or one.

In some cases, in order to determine with an adequate measure of assurance (i.e., with sufficiently high probability, such as the probability of 0.9, 0.99, 0.999 and the like) that a video is distributed by a video receiving device, the video may include a large number of symbols (also for clarity referred to as anti-collusion symbols or anti-collusion characters) that form an anti-collusion code. In various embodiments, anti-collusion codes may be used to identify a user who may be engaged in submitting copyright videos to one or more pirate sites. The number of the anti-collusion symbols for establishing that a video is distributed by a video receiving device depends on a number of colluders. The dependency is quadratic. For example, if the number of pirates doubles, the code length should be four times larger. The size of a code length may require using long video segments or multiple video segments. For example, a table below illustrates a number of anti-collusion symbols in the column "Code Length" corresponding to a number of colluders, as shown in the column "# Colluders." A column "Total Time (minutes)" indicates how much video time is needed to embed the anti-collusion symbols of an anti-collusion code of a given code length. The total time column assumes that one watermark character is embedded per a video segment and that each segment is five seconds long.

| #Colluders | Code Length | Total Time (minutes) |
|---|---|---|
| 2 | 210 | 17.5 |
| 4 | 1100 | 91.6 |
| 6 | 2250 | 187.5 |
| 8 | 3500 | 291.6 |

The present disclosure also addresses the problem of having too many anti-collusion symbols (represented, for example, by bits of data such as "0" and "1") in a single video by distributing anti-collusion symbols across multiple videos (or across any other suitable multimedia content, such as audio data). Multiple videos distributed by an account of a user may be treated as a single "long video," and the anti-collusion codes of the long video may be used for calculating an aggregated probability that at least some of videos distributed by the account of the user are distributed by an identified video receiving device. A motivation for using multiple videos as an effective single video is based on typical approaches used by pirates to pirate multimedia content such as videos. For example, a pirate may typically upload pirated content continuously over an open Internet or private networks (for cases when a pirate uploads a single video, the necessity of identifying the pirate may be sufficiently low to not warrant the use of computer resources for identifying the pirate).

Furthermore, videos that may be continuously uploaded by a pirate may have one or more common characteristics that may correspond to patterns found in a pirate's behavior. Such characteristics may be found in all, most, or some of the videos distributed by a pirate (i.e., distributed from an account of a user associated with the pirate). For example, a pirate may use the same commercial encoder with the same configuration to re-encode the pirated uncompressed content, and/or a pirate may upload their stolen content to the same web sites or the same set of private networks. Other common characteristics may be a common genre associated with distributed videos, or a common one or more shows depicted in the distributed videos. Any other common characteristics may be identified (e.g., if a video has a mark associated with a pirate, or if a pirate distributes videos with a particular type of modification (e.g., stretched videos, zoomed videos, videos with a modified sound, and the like). In an example embodiment, the method may include identifying at least one common characteristic for at least some of the videos from the plurality of videos. The common characteristic may be an encoder used for encoding at least some of the videos, a website for hosting at least some of the videos, or a private network for distributing at least some of the videos.

Aspects of the method for identifying a video receiving device may include identifying the device by traitor tracing using anti-collusion codes. The anti-collusion symbols may be inserted into segments of a video V transmitted to a user device U, and may reflect an identification of user device U (herein referred to as a user device ID). Further, the anti-collusion code may be unique for a video V. For a given video V, and device U an anti-collusion identification (ACID) codeword may be used. The codeword may include characters "0"s and "1"s. In various embodiments, the following requirements may be satisfied (1) for a certain user device U, the corresponding ACID for a first video (e.g., video $V_1$) may be different than the one used for a second video $V_2$. and (2) for a video V, an ACID for a first user (e.g., user $U_1$) should be different than the one used for a second user (e.g., user $U_2$). In an example embodiment, requirements (1) and (2) can be achieved by using numerical characteristics for video V and user U (e.g., numerical characteristics may be unique identifiers for video V and user U) as a seed for the pseudorandom generator. In an example embodiment, an ACID should be encoded in a watermark that is embedded in a video V for user U.

Additionally, aspects of the present disclosure include embedding non-anti-collusion codes. Such codes may enable a fast detection in a case when the pirate is not part of a coalition of colluders.

Aspects of the method for identifying a video receiving device may include obtaining a plurality of videos containing anti-collusion codes, the plurality of videos distributed by an account of a user (e.g., a YouTube account, mimeo account, or any other suitable identifiable account, video channel, message channel, peer-to-peer participant, and the like). In some embodiments, the method may include calculating an aggregated probability that a device is a video receiving device for the plurality of videos, wherein the aggregated probability is calculated based on the anti-collusion codes contained in the plurality of videos. For example, an aggregated probability may be calculated using all of the anti-collusion symbols obtained in the plurality of videos. When the aggregated probability is above a threshold value, the method may include identifying the device as the video receiving device for receiving at least some videos from the plurality of videos. In various embodiments, a threshold value may be a value sufficiently close to one. For example, the threshold value may be 0.9, 0.99, 0.999, 0.9999, or may be given by 1−ϵ, where ϵ is a small number (e.g., 1E−6) and may correspond to an acceptable false-positive value. It should be noted that the aggregated probability is calculated to ensure that we can detect the video receiving device identification (device ID) after the plurality of videos were altered via the collusion attack.

In some embodiments, obtaining a plurality of videos that include digital watermarking may include obtaining a video from an account of a user, processing a video to determine if the video contains digital watermarks, and associating the video with the plurality of videos if the video contains the digital watermarks. In various embodiments, determining whether the video includes digital watermarks may use any suitable approach known in the art of digital watermarking (e.g., checking for the existence of a pattern associated with the digital watermark).

In some embodiments, an image recognition software may be used to find an original video corresponding to the obtained video. The image recognition software may be configured to select one or more video frames of the obtained video and identify the corresponding one or more frames of the corresponding original video stored in a database (e.g., database 111, as shown in FIG. 1A). In some cases, the original video may be determined based on metadata that may be associated with the obtained video (e.g., a name of the obtained video, text data found in the obtained video, size of the obtained video, length of the obtained video, and the like).

Figure 2:
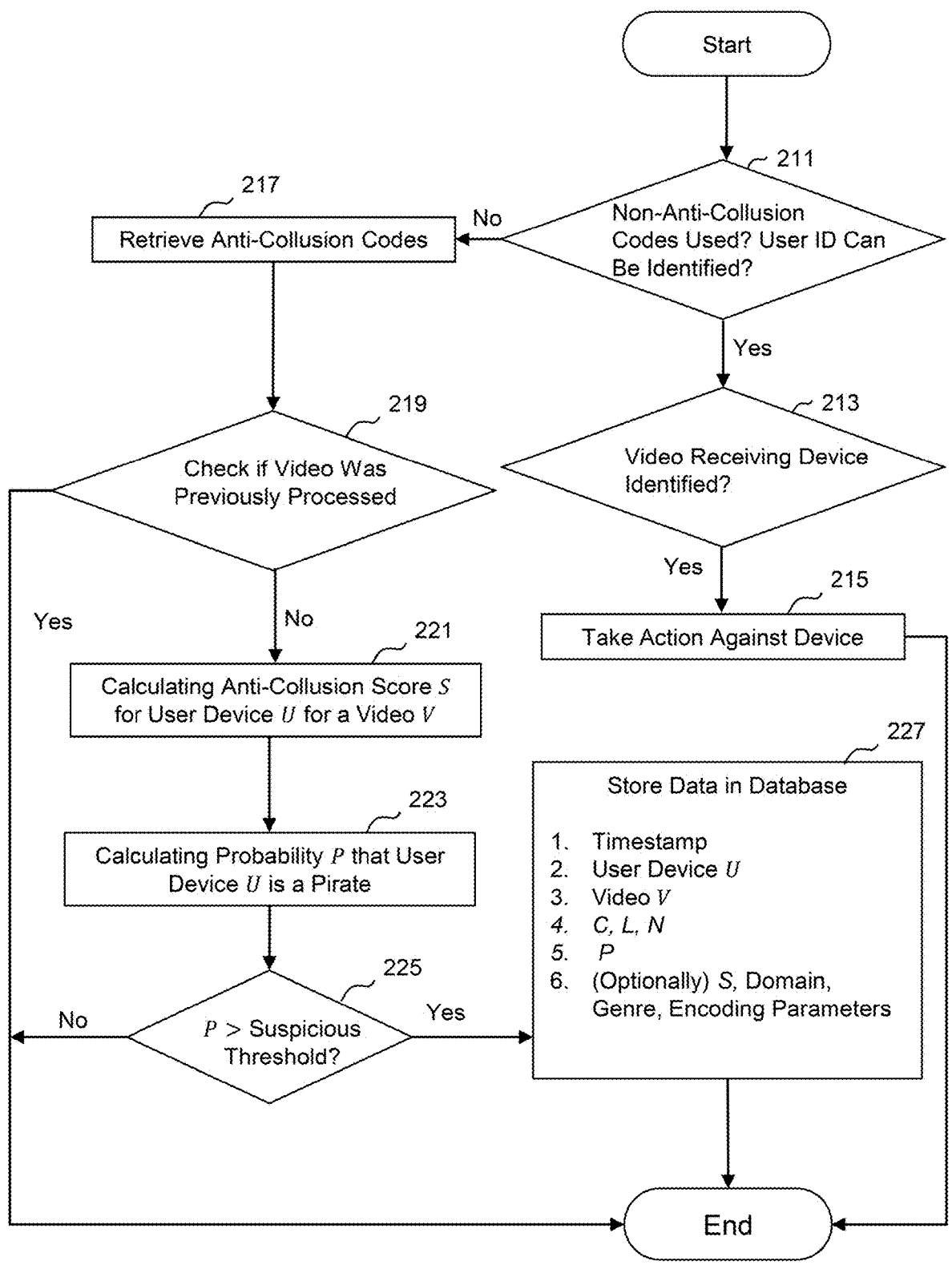
FIG. 2 is an example process of determining a probability that a device is a content receiving device, consistent with disclosed embodiments.

An example process 201 for identifying a video receiving device (e.g., device U) is shown in FIG. 2. For an illegal copy of a video V (for example, which was found on the internet by an appropriate search operation performed by, for example, a web crawler), the following list of steps may be performed by process 201. At step 211, process 201 may determine if non-anti-collusion codes are present in video V. If non-anti-collusion codes are identified in video V (step 211, Yes), process 201 may determine if the video receiving device U may be identified at step 213. If device U may be identified (step 213, Yes), process 201 may proceed to step 215 and take action against device U. An example action may include blacklisting device U, blacklisting account associated with device U, and the like. Herein, blacklisting may refer to terminating a streaming service for device U and/or account associated with device U. In various embodiments, device U ID may be identified via non-blind (or blind) detection.

Alternatively, if non-anti-collusion codes were not used by a content service provided or if a user device ID cannot be identified from such non-anti-collusion codes (step 211, No), process 201 may proceed to step 217 and retrieve anti-collusion codes found in video V (only videos that have anti-collusion codes may be considered, and the ones that do not have anti-collusion codes may be discarded).

At step 219, process 201 may check if video V was previously processed (e.g., by checking whether previous records indicate that the video was processed). Such a check may be useful since processing the same video copy with the same watermark multiple times may increase the probability of false positives. In an example embodiment, a certain number of bits (e.g., five percent, ten percent, twenty percent, thirty percent of the bits, and the like) of video V may be different from bits of any other video that was previously processed to determine that video V was not previously processed. If video V was previously processed (step 219, Yes), process 201 may be terminated. Otherwise, (step 219, No) process 201 may continue to group of steps 221-227. At step 221 for every user device U, an anti-collusion score S(U, V) (e.g., Laarhoven score) may be calculated. Herein, score S depends on user device U, and video V. At step 223, a probability P(S(U, V); C, L, N) that user device U is illegally distributing video V (i.e., device U is a pirate) may be computed. Probability P depends on calculated score S, a number of colluders C, a code length L, and a number of user devices N for receiving video V. In some cases, probability P may be computed using a mathematical equation, and in other cases, the probability may be computed using Monte Carlo simulations. For example, Monte Carlo simulations may be computed for each set of parameters (e.g., number of colluders, numbers of users, a code length, and the like). In an example embodiment, colluders may be chosen randomly, and the anti-collusion score may be calculated for each user. Such a process of selecting colluders and calculating anti-collusion scores may be repeated multiple times (e.g., one to ten million times) with different users chosen as colluders. In various embodiments, Score S and probability P may be calculated for reasonable values of C (e.g., four, six, seven, eight, nine, ten, or more), which may be selected based on equipment available for recording and distributing multimedia content. At step 225, process 211 may determine if P is greater or equal to a suspicious threshold (e.g., the suspicious threshold may be in a range of 0.05 to 0.2). If P is greater than the suspicious threshold (step 225, Yes), process 211 may proceed to step 227 which includes storing in a database various data associated with user device U and video V such as a timestamp determining when this video was found, user device U identification, information about video V (e.g., video V name, or any other suitable identification for video V), values for C, L, and N. and probability value P. At step 227, a score S calculated for user U for video V, as well as encoding parameters for video V such as (CBR/VBR, bitrate, GOP size, B frames existence, resolution, and the like) is stored. Further, at step 227, optionally, a domain name of a website for distributing video V and a genre/type of video V (e.g., video V being News Channel) may be stored.

An example process 301 for identifying a video receiving device is shown in FIG. 3A. At step 311, process 301 may include obtaining a plurality of videos from an account of a user, the plurality of videos containing anti-collusion codes, as described above. At step 313, process 301 may include calculating an aggregated probability that a device is the video receiving device for the plurality of videos, wherein the aggregated probability is calculated based on the anti-collusion codes contained in the plurality of videos, and at step 315, process 301 may include evaluating if the calculated aggregated probability is above a predetermined threshold value. If the aggregated probability is above the predetermined threshold value (step 315, Yes), process 301 may proceed to step 317 to determine that the device is the video receiving device and take actions against the device (e.g., blacklist the device by preventing the device from receiving any videos from a content distributing network for broadcasting videos). Alternatively, if the aggregated probability is below the predetermined threshold value (step 315, No), process 301 may complete without taking any actions against the device.

In various embodiments, calculation of the aggregated probability may not need to be done every time to identify pirated content. For example, when a user device ID may be extracted from a digital watermark, the aggregated probability may not need to be calculated. In various cases, information about a user as well as historical information about content that was previously requested by the user (e.g., movies watched by the user and their score/probability) may be collected and stored in a database. The collected information may be used to calculate the aggregated probability based on anti-collusion symbols found in the plurality of videos consumed by the user.

Figure 3B:
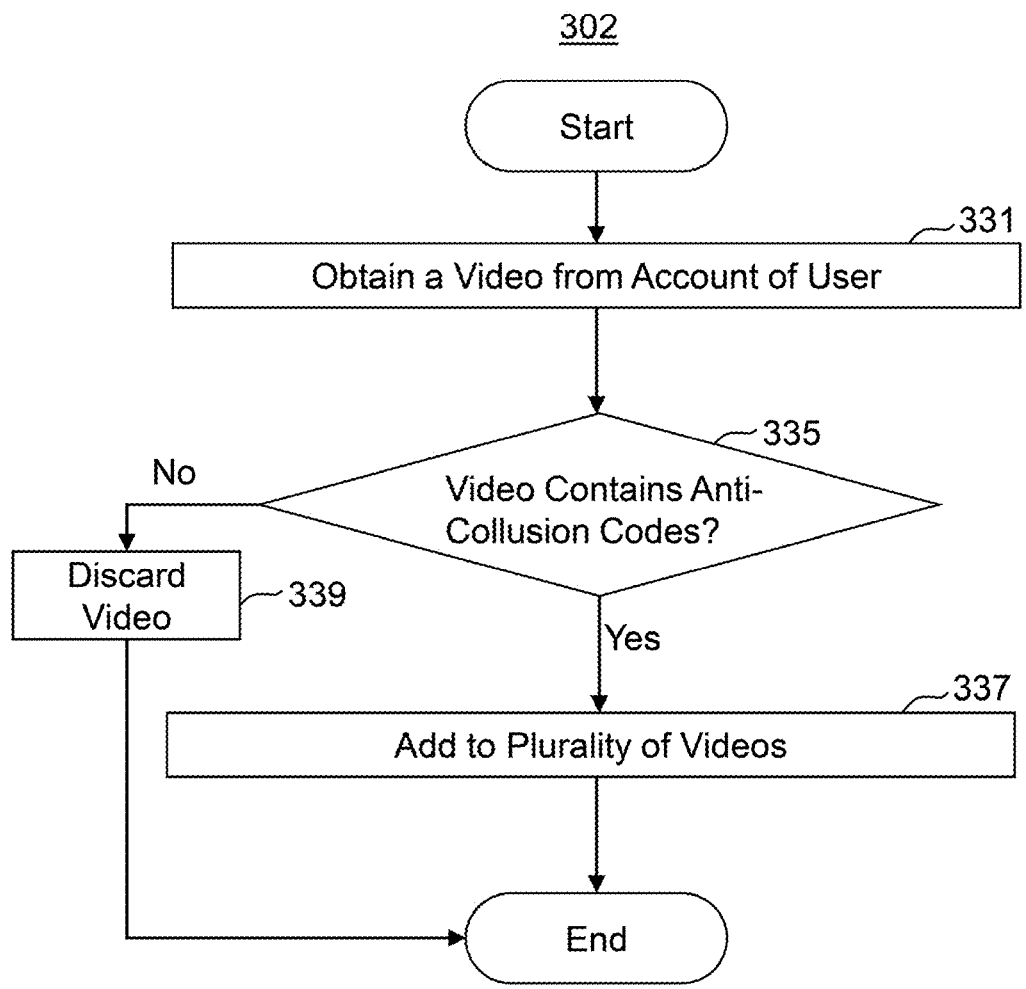
FIG. 3B is an example process of collecting content that contains anti-collusion codes, consistent with disclosed embodiments.

FIG. 3B shows an example embodiment of process 302 for obtaining a plurality of videos containing anti-collusion codes. At step 331, process 302 may obtain a video from an account of a user, and at step 335, process 302 may determine if the video contains anti-collusion codes using any suitable approaches as previously described. If the video contains anti-collusion codes (step 335, Yes), the video may be added to the plurality of videos that contain anti-collusion codes. Alternatively, if the video does not contain anti-collusion codes (step 335, No), the video may be ignored/discarded, as shown by step 339.

In some cases, videos obtained from an account of the user may be analyzed for determining the presence of a watermark. If a watermark is identified, the method for identifying a video receiving device may include determining based on the watermark a device identification for the video receiving device. If the device identification is obtained, the method may be configured to take action against the device (e.g., blacklist the device).

Figure 3C:
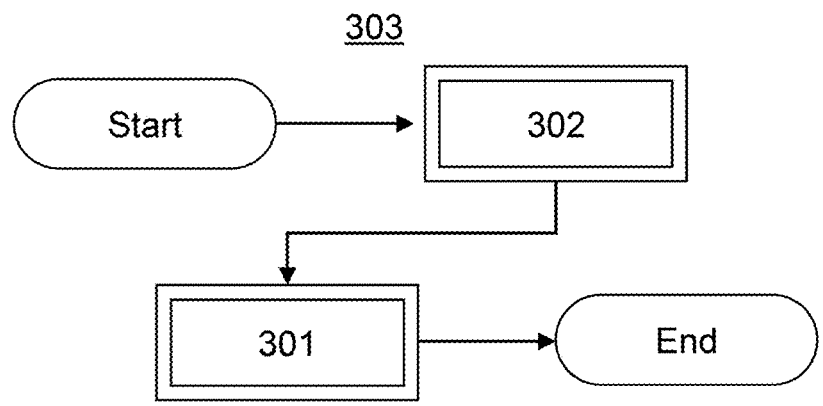
FIG. 3C is an example process of combining identifying a content receiving device and collecting content that contains anti-collusion codes, consistent with disclosed embodiments.

FIG. 3C shows an example process 303, that may be configured to first execute process 302 and then execute process 301. For example, process 302 may be executed to obtain a plurality of videos that contain anti-collusion codes, and such videos may be used for process 301.

FIG. 4A shows an example process 401 for identifying a video receiving device. At step 411, process 401 may include receiving a video (e.g., the video may be retrieved from an account of a user, as described above). At step 413, the video may be analyzed to determine if it contains a watermark that identifies a used device. If the watermark is found, and if it identifies a user device (step 413, Yes), process 401 may take actions against the user device at step 415 (e.g., blacklist the user device, as described above). Step 415 of process 401 may be the same as step 217 of process 201. Alternatively, if the watermark is not found, or if the found watermark does not identify a user device (step 413, No), process 401 may determine if the video contains anti-collusion codes at step 417. If the video does not contain anti-collusion codes (step 417, No), the video may be ignored or discarded at step 430. Alternatively, if the video contains anti-collusion codes (step 417, Yes), process 401 may proceed to step 419 and calculate an anti-collusion score S and a probability of collusion P for each one of user devices N that are configured to receive videos from a content distributing network (i.e., each one of the devices that are subscribed to a broadcasting service administered by a content distributing network).

In various embodiments, anti-collusion score S may be calculated using any suitable approach known in the art. For example, the score may be calculated using a scoring function as defined for Tardos codes, and anti-collusion score may be calculated using the same approach as used to calculate the score for Tardos codes.

Figure 4B:
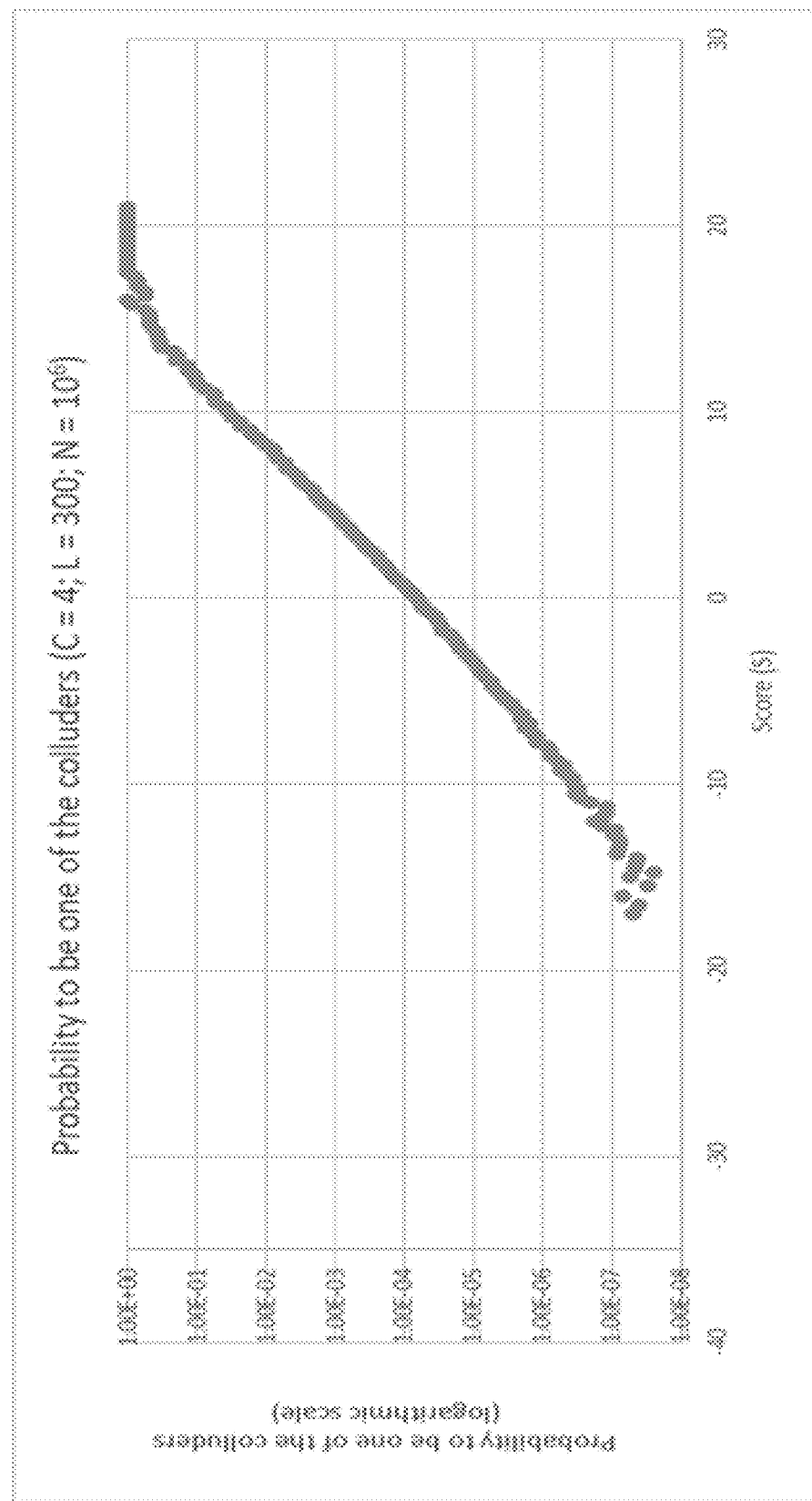
FIG. 4B is an example probability for identifying a content receiving device as a function of anti-collusion score, consistent with disclosed embodiments.

Probability of collusion P may depend on anti-collusion score S, a number of colluders C, a number of anti-collusion codes L, and a number of devices N configured to receive broadcasting service, as previously described. As previously shown, $P=P(S(U, V_i); C, L, N)$ when calculated for a user device U and video $V_i$. An example calculation of the probability of collusion as a function of score S is shown in FIG. 4B for values C=4, L=300, and N=1,000,000. As seen in FIG. 4B, as score S increases, probability P approaches one.

Returning to FIG. 4A, after completing step 419, process 401 may proceed to step 421, at which probability P may be compared with a suspicious threshold. The suspicious threshold may be any suitable value for probability indicating a likelihood that a device may have been used as the video receiving device. For example, the suspicious threshold may be 0.05-0.2 or, in some cases, may include higher or lower values. If probability P is less than the suspicious threshold (step 421, No), process 401 may proceed to step 400 and ignore or discard the video. Alternatively, if probability P is greater or equal to the suspicious threshold (step 421, Yes), process 401 may proceed to step 423 and record information related to the device (for which probability P was calculated) to a database.

In an example embodiment, at step 423, any suitable information related to the device may be recorded. For example, a timestamp of when a video containing anti-collusion codes, for which probability P was calculated, was found, an identification for the device, an identification for the video, the assumed number of colluders, a number of anti-collusion codes identified the video containing anti-collusion codes, as well as the value of probability P may be recorded. In some cases, a plurality of videos for which it is determined that probability P is higher or equal to a suspicious threshold may also be stored in the database for the device. In some cases, domains for distributing a plurality of videos may be recorded, a genre of the plurality of videos, and various encoding parameters for the plurality of videos such as CBR/VBR, bitrate, GOP size, B frames existence, resolution, and the like.

While not shown as a step of process 401, in some cases, at least some information related to the device (for which probability P was calculated) may be removed from the database. In an example embodiment, the information may be removed based on a time at which the information was added to the database (e.g., the information that is "old" may be removed). The old information may be any type of information that has resided in the database for a predetermined amount of time (e.g., more than ten days, twenty days, thirty days, and the like). In some cases, if for new videos (that have anti-collusion codes and are identified by a system for collecting the videos, such as web crawler, as described above), it is determined that probability P is higher or equal to a suspicious threshold for a given device, the new videos may be added to the database as a part of a record corresponding to the given device, while older videos may be removed from the database. In an example embodiment, if aggregated code length for anti-collusion codes L for all the videos stored in the database for the device is larger than a target effective length L' (i.e., if $\Sigma_i L_i > L'$) then some of the older videos may be removed to maintain $\Sigma_i L_i \leq L'$. Here the sign of summation indicates that summation is over all videos $V_i$ stored in the database, with $L_i$ being a number of anti-collusion symbols for a video $V_i$. The effective length L' may be defined as $L'=f \cdot l$, where l may be the smallest required anti-collusion code length for identifying a device as the video receiving device, and f may be an appropriate factor, which may be in the rage of 2-4.

Once probabilities P for a plurality of videos containing anti-collusion codes have been determined, the method for identifying a video receiving device may include calculating aggregated probability, as shown in FIG. 2A, for example, by step 213 of process 201. In an example embodiment, aggregated probability $P_a$ for a given device may be calculated as $P_a = 1 - \Pi_i(1 - P(S(U, V_i); L, C))$, where index i indicates that P is a probability calculated for the ith video $V_i$ in the plurality of videos. Herein, expression $P_a = 1 - \Pi_i (1 - P(S(U, V_i); L, C)$ is referred to as an aggregated probability expression, and such expression may be used for calculation of the aggregated probability $P_a$. Thus, calculating the aggregated probability for the device may include calculating a difference between one and a product of a plurality of probabilities, each one of the plurality of probabilities indicating a probability that the device is not the video receiving device for a video containing anti-collusion codes, where the video may be one of the plurality of videos.

In an example embodiment, steps 411-423 of process 401 are performed for every device of all devices N subscribed to a broadcasting service. Thus, for every device and a given video, process 401 may calculate probability P that the device is the video receiving device for the given video. To indicate that probability P is calculated for a given device and a given vide probability P may be written as $P(S(U_m, V_i)L, C)$, with $V_i$ indicating a video for which P was calculated and $U_m$ indicating a device for which P was calculated.

Figure 5:
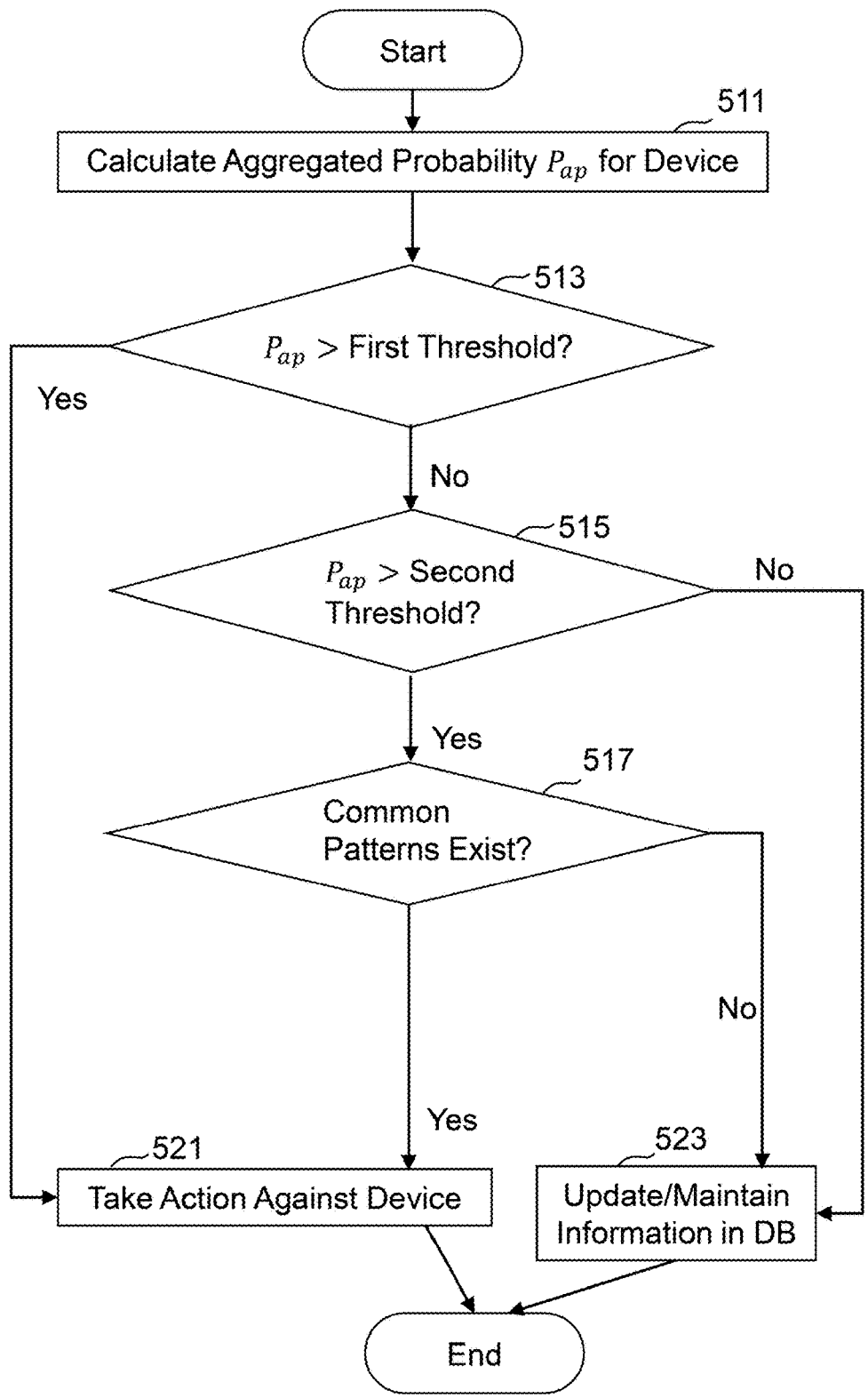
FIG. 5 is an example process for identifying a device as a possible content receiving device based on a calculation of an aggregated probability, consistent with disclosed embodiments.

FIG. 5 shows an example process 501 for determining if a device is the video receiving device based on the calculated aggregated probability. At step 511, process 501 may include calculating aggregated probability $P_a$ for a device (e.g., every device out of N devices subscribed to a broadcasting service), as described above. At step 513, process 501 may compare aggregated probability $P_a$ and a threshold value, where the threshold value may be a first threshold value. In an example embodiment, the first threshold value may be any suitable value and may be sufficiently close to one. For example, the first threshold value may be given by $1-\epsilon$, as described above, where $\epsilon$ is a false-positive value, and may be small (e.g., $\epsilon=1, E-6$). If aggregated probability $P_a$ is larger than the first threshold value (step 413, Yes), process 501 may proceed to step 521 and take actions against the device as described above (e.g., step 521 may be the same as step 415, as shown in FIG. 4A, or step 215, as shown in FIG. 2). If aggregated probability $P_a$ is less than or equal to the first threshold value (step 513, No), process 501 may proceed to step 515 and determine if the aggregated probability $P_a$ is less than a second threshold.

If aggregated probability $P_a$ is less than or equal to the second threshold value (step 515, No), process 501 may be configured to proceed to step 523 and maintain information related to a device for which the aggregated probability is calculated in a database. In various embodiments, the information may be maintained if at least one probability $P(S(U_m,V_i), L, C)$ for at least one video from the plurality of videos is larger than a suspicious threshold as indicated by step 421 of process 401, as shown in FIG. 4A. In some cases, if any relevant information is missing or incorrect in the database, the information may be recorded and/or updated. Notably, provided that process 401 has been performed to calculate probabilities $P(S(U_m,V_i), L, C)$ (and process 401 may be performed before calculating the aggregated probability $P_a$), at step 523, the information may be updated in the database. For example, the information may be updated if it is different from information previously stored in the database.

If the aggregated probability $P_a$ is greater than the second threshold value (step 515, Yes), process 501 may be configured to proceed to step 517 and check if the plurality of videos includes at least one common characteristic (also referred to as a common pattern), as previously described. In an example embodiment, if at least some of the videos from the plurality of videos include a common pattern (step 517, Yes), process 501 may proceed to step 521 described above, and if there is not at least a pair of videos that includes a common pattern (step 517, No), process 501 may proceed to step 523, as described above. In various embodiments, process 501 may include adjustable constants that may define a flow pattern of process 501. For example, a first constant $C_1$ may be associated with a minimum number of multimedia content copies that share one or more common patterns. For instance, $C_1$ may be two, three, four, or any other suitable number. In an example embodiment, if more than $C_1$ videos include a common pattern (step 517, Yes) may proceed to step 521; otherwise, (step 517, No), process 501 may proceed to step 523, as described above. Additionally, in some cases, more than one common pattern may be required to be shared by a number of multimedia content copies to proceed to step 521.

Various variations of process 501 may be possible. For instance, various common patterns, as described above, may have assigned weights, and such weights may be used to calculate a common pattern score using any suitable analytical means (e.g., algebraic expressions) and/or computer-based models. A common pattern for videos may include using the same commercial encoder with the same configuration to re-encode uncompressed multimedia content, or uploading re-encoded content to the same web sites or the same set of private networks. In some cases, if two common patterns are present, the common pattern score may be larger than when only one common pattern is present. Additionally, or alternatively, some common patterns may have a larger associated weight than other common patterns. If a common pattern score exceeds or equal to a threshold value, process 501 may be configured to proceed to step 521, and if the common pattern score is below the threshold value process 501 may be configured to proceed to step 523.

In some embodiments, the method for determining from among network-connected devices a particular device likely associated with a theft of distributed content may include determining whether a calculated aggregated probability is above an aggregated suspicious threshold value, and storing information related to the device in a database when the aggregated probability computed for the device is above the suspicious threshold value. In an example embodiment, the aggregated suspicious threshold value may be the same as a suspicious threshold (as used in connection with a description of FIG. 4A), or it may be larger or smaller than the suspicious threshold. In some embodiments, the aggregated suspicious threshold value may be smaller than the first threshold value (as shown in FIG. 5).

Aspects of the present disclosure also include a system for distributing videos to user devices and identifying a video receiving device. The system may be any suitable computer-based system such as, for example, server 110, as shown in FIG. 100. In an example embodiment, server 110 may use a processor (e.g., processor 161) to perform various operations such as operations for distributing one or more videos to a user device. Additionally, or alternatively, some of the operations may be performed by edge computing systems 132, as shown in FIG. 1A. Such operations are described by an example process 601, as shown in FIG. 6A. At step 609, process 601 may include obtaining an identification associated with a user device configured to receive a video. The identification may be any suitable identification, as described above. Process 601 may proceed to step 611 and generate a watermark for a video, the watermark reflecting the user device identification. The watermark may be generated using any suitable approach, as described above. Process 601 may then proceed to step 613 at which anti-collusion codes may be generated for the video to be delivered to the user device. The anti-collusion codes may include a plurality of characters (e.g., bits "0" and "1"). At step 615, process 601 may provide the video to the user device, with the video having embedded the generated watermark and the generated anti-collusion codes. The anti-collusion codes may be embedded in a video using a probabilistic approach as previously described. In various embodiments, as described before, the watermark is not visually observable during playback of the video containing the watermark.

Figure 6B:
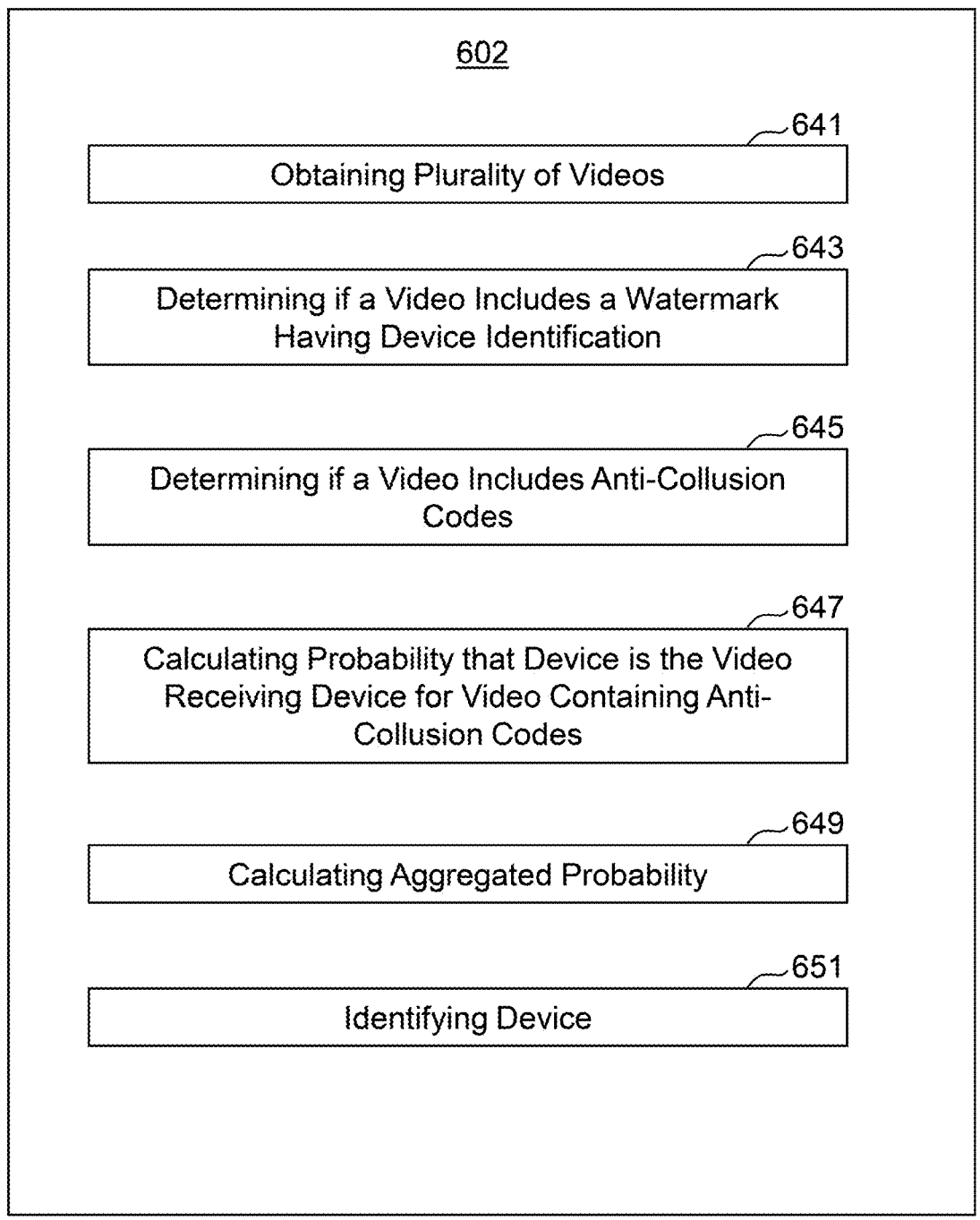
FIG. 6B is another example process for identifying content receiving device, consistent with disclosed embodiments.

Additionally, server 110 may use a processor (e.g., processor 161) to perform various operations such as operations for identifying a video receiving device. FIG. 6B shows an example set of operations 602 for identifying the video receiving device. The operations may be part of a process of identifying the video receiving device as shown, for example, by processes 201, 301, and 401, depicted in corresponding figures FIG. 2A, FIG. 3, and FIG. 4. Operations 602 may include an operation 641 for obtaining a plurality of videos from an account of a user, an operation 643 for determining whether one of the plurality of videos includes a watermark having a user device identification, an operation 645 for determining whether one of the plurality of videos includes anti-collusion codes, an operation 647 for calculating a probability indicating that a device is a video receiving device for a video containing anti-collusion codes, an operation 649 for calculating an aggregated probability that a device is a video receiving device for a plurality of videos that contain anti-collusion codes. The aggregated probability may be calculated based on the anti-collusion codes contained in the set of videos, as described above. Additionally, operations 602 may include an operation 651 for identifying a device as the video receiving device for receiving at least some videos from the plurality of videos based on the calculated aggregated probability.

In some embodiments, the method for identifying a video receiving device may include processing a video (e.g., determining whether a video contains a watermark, determining whether the video includes anti-collusion codes, calculating anti-collusion score for the video, calculating a probability for the video and a device that the device is the video receiving device, and the like). The method may include any suitable checks to ensure that the same video is not processed multiple times (or is not processed more than one time). For example, the method may include comparing a video that is about to be processed to previously processed videos, and forgo processing the video if a first set of frames of the video contains substantially the same information as at least one of the previously processed videos. In an example embodiment, the first set of frames may include any suitable number of frames, and such frames may be compared to frames of previously processed videos using any suitable approach (e.g., using an image recognition software as discussed above).

As described above, network system 100 may include various devices, such as processors, memory devices, and various client devices. For example, client devices 150 may include one or more computing devices configured to perform one or more operations consistent with disclosed embodiments. For example, client devices 150 may include a desktop computer, a laptop, a server, a mobile device (e.g., tablet, smartphone, etc.), a set-top box, a gaming device, a wearable computing device, or another type of computing device. Client devices 150 may include one or more processors configured to execute software instructions stored in memory, such as memory included in client devices 150, to perform operations to implement the functions related to requesting content, receiving the content, and playing the content. Client devices 150 may be configured for wired and/or wireless communications and may include software that, when executed by a processor, performs internet-related communication (e.g., TCP/IP) and content display processes. For instance, client devices 150 may execute browser software that generates and displays interfaces including content on a display device included in, or connected to, client devices 150. Client devices 150 may execute applications that allow client devices 150 to communicate with components over network system 100, and generate and display content in interfaces via display devices included in client devices 150. For example, client devices may display a media player to output content received from edge computing system 131.

The disclosed embodiments are not limited to any particular configuration of client devices 150. For instance, a client device 150 may be a mobile device that stores and executes an application for performing operations of requesting, receiving, and playing the content. In certain embodiments, client devices 150 may be configured to execute software instructions relating to location services, such as GPS locations. For example, client devices 150 may be configured to determine a geographic location and provide location data and time stamp data corresponding to the location data to computing system 131.

Server 110 may include one or more computing systems that perform various operations such as storing content, computing compression parameters for the content, providing the content, retrieving the content from database 111, and the like. Server 110 may include processors that perform authentication functions of client devices 150, users of client devices 150, and/or resolve client identities based on client IDs and/or a secure token. In some embodiments, server 110 may include processors configured to compress video or audio content and packet content in different formats. Further, server 110 may include processing devices to resolve URLs. In some embodiments, server 110 may include multiple core processors to handle concurrently multiple operations and/or streams. For example, server 110 may include parallel processing units to concurrently handle requests of multiple client devices 150.

In some embodiments, server 110 may store the original and/or compressed version of content and send copies of the original and/or compressed content to edge computing system 131. For example, server 110 may compress an original video file and send it to system 131, which may then store it in the cache. In such embodiments, server 110 may allow automatic requests from edge computing system 131. However, in other embodiments, server 110 may implement firewalls that only allow a limited number of pull requests or only allow periodic pull requests to update content. Server 110 may be configured to automatically handle specific requests from edge computing system 131. For example, when edge computing system 131 performs a pull request due to a "cache miss," server 110 may be configured to redirect edge computing system 131 to a different memory address. In such embodiments, server 110 may include a relational database, or other similar data structures, to correlate the pull request from edge computing system 131 with an address that has a copy of the content. Further, server 110 may include dedicated hardware to perform redirecting operations. For example, server 110 may include a simple RISC computer (SRC) architecture, or other reconfigurable computing systems, specifically configured to handle pull requests with "cache miss."

Database 111 may include one or more computing devices configured with appropriate software to perform operations for providing content to server 110. Database 111 may include, for example, Oracle™ database, Sybase™ database, or other relational databases or non-relational databases, such as Hadoop™ sequence files, HBase™, or Cassandra™. In an illustrative embodiment, database 111 may include computing components (e.g., database management system, database server, etc.) configured to receive and process requests for data stored in memory devices of the database and to provide data from the database.

Database 111 may be configured to collect and/or maintain the data associated with user accounts and user preferences. For example, database 111 may store information about user privileges. Database 111 may collect the data from a variety of sources, including, for instance, online resources.

Network system 100 may include any type of connections between various computing components. For example, network system 100 may facilitate the exchange of information via network connections that may include Internet connections, Local Area Network connections, near field communication (NEC), or other suitable connection(s) that enables the sending and receiving of information between the components of system 100. In some embodiments, one or more components of system 100 may communicate directly through a dedicated communication link(s).

As described above, edge computing system 131 may transmit content to user device 151. System 131 may store content in local memories, such as caching infrastructures associated with system 131, local proxies, and/or the HTTP caching capability. In some embodiments, system 131 may perform functions such as routing content, resolving domain systems, handling content requests, and creating sessions with client devices for content delivery. System 131 may obtain information from other computing systems (e.g., server 110 or computing system 133, as shown in FIG. 1A), arrange it for client devices, and deliver it to client devices 150. In such embodiments, system 131 may be configured to handle multiple streams in parallel, such as providing different data streams to multiple client devices 150. Further, system 131 may be configured to provide authentication credentials to client devices 150. For example, system 131 may provide a secure cookie, or an equivalent technique for authentication, at a session startup time.

In some embodiments, an edge computing system (e.g., system 133) may take the form of a server, a general-purpose computer, a mainframe computer, or any combination of these components. In other embodiments, edge computing system 133 may be a virtual machine. System 133 may be configured to communicate with one or more databases, such as database 111, and other elements of system 100 either directly or via network connections.

System 133 may include one or more storage devices configured to store instructions used by processors of system 133 to perform functions related to disclosed embodiments. For example, memory storage devices may store software instructions.

In some embodiments, processors of server 110 (e.g., processors 161) may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, processors 161 may be a plurality of devices coupled and configured to perform functions consistent with the disclosure. For example, processors 161 may include a plurality of co-processors, each configured to run specific server 110 related operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like.

It is to be understood that the configuration and the functionality of components of system 100 have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

In various embodiments, there are numerous advantages for inserting anti-collusion codes and watermarks at edge computing systems 132 instead of at the server 110. For example, edge computing systems 132 may have significantly more critical resources, such as memory (e.g., random access memory (RAM)), and processing power. An edge computing system (e.g., system 131, as shown in FIG. 1A) may have limited scalability because it needs to support only devices that request content from that system. Further, system 131 may be configured to support any device, and system 131 may be secure, as it may prevent any individual or software accessing its operational system, applications running on system 131, and any content of system 131. In various embodiments, a digital marking of a video may be stateless (i.e., designed not to remember preceding events or user interactions), and thus, it can be done at any edge computing system independently, without a need for shared memory or for database synchronization. Hence, a mobile device (e.g., device 152, as shown in FIG. 1A) that changes the connection from one edge computing system to another may get content that contains a digital watermark based on device 152 identifiable information (e.g., device MAC address).

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for identifying from among network-connected devices a particular device associated with a potential theft of distributed content, the method comprising:
   obtaining content, the content having been distributed from a particular one of the network-connected devices;
   identifying in the obtained content anti-collusion codes;
   calculating an aggregated probability for the particular one of the network-connected devices using the identified anti-collusion codes, the aggregated probability being based on a plurality of probabilities using the identified anti-collusion codes;
   determining the particular one of the network-connected devices is associated with potential theft of distributed content using the calculated aggregated probability, wherein each of the plurality of probabilities indicates a probability that the particular one of the network-connected devices is associated with potential theft of distributed content; and
   blacklisting, based on whether the aggregated probability is equal to or exceeds the predetermined threshold at least one of the particular one of the network-connected devices or an account associated with the particular one of the network-connected devices.

2. The method of claim 1, further comprising determining if at least some content of the obtained content includes a watermark containing a device identification.

3. The method of claim 1, wherein the identified anti-collusion codes comprise Tardos codes.

4. The method of claim 1, further comprising identifying at least one common characteristic for at least some of the obtained content, the common characteristic being one of a content encoder used to encode the at least some of the obtained content, a website for hosting content, or a private network for distributing content.

5. The method of claim 1, further comprising calculating an anti-collusion score for the particular one of the network-connected devices.

6. The method of claim 5, further comprising calculating a probability for the particular one of the network-connected devices based on the calculated anti-collusion score, and a predetermined number of colluders.

7. The method of claim 6, further comprising evaluating whether the probability is above a suspicious threshold value, and storing information related to the probability when the probability is above the suspicious threshold value.

8. The method of claim 7, wherein the information related to the probability comprises:
   a timestamp of when the at least some of the obtained content was found;
   a device identification;
   a content identification;
   the predetermined number of colluders;
   a number of anti-collusion codes identified in the at least some of the obtained content; and the probability for the particular one of the network-connected devices to be associated with the potential theft of distributed content.

9. The method of claim 1, wherein calculating the aggregated probability for the particular one of the network-connected devices comprises an aggregated probability expression.

10. The method of claim 1, wherein the threshold value is a first threshold value being one minus an acceptable false positive value.

11. The method of claim 1, further comprising:
identifying at least one common characteristic for at least some of content of the obtained content, and
when the at least one common characteristic is identified, using a second threshold value as the threshold value, the second threshold value being smaller than one minus an acceptable false positive value.

12. The method of claim 1, further comprising:
determining whether the aggregated probability is above an aggregated suspicious threshold value; and
storing information related to the particular one of the network-connected devices in the database when the aggregated probability is above the aggregated suspicious threshold value.

13. The method of claim 12, wherein the aggregated suspicious threshold value is less than the threshold value.

14. The method of claim 1, further comprising processing the obtained content by determining if the obtained content contains a watermark or determining if the obtained content contains anti-collusion codes, and further comprising comparing the obtained content, prior to processing the obtained content, to previously processed content, and forgo processing the obtained content when the obtained content contains the same information as the previously processed content.

15. A system for identifying from among network-connected devices a particular device likely associated with a potential theft of distributed content, the system comprising a memory storing instructions and a processor executing instructions for performing operations comprising:
obtaining content, the content having been distributed from a particular one of the network-connected devices;
identifying in the obtained content a subset of the distributed content containing anti-collusion codes;
calculating an aggregated probability for the particular one of the network-connected devices using the identified anti-collusion codes, the aggregated probability being based on a plurality of probabilities using the identified anti-collusion codes;
determining the particular one of the network-connected devices is associated with potential theft of distributed content using the calculated aggregated probability wherein each of the plurality of probabilities indicates a probability that the particular one of the network-connected devices is associated with potential theft of distributed content; and
blacklisting, based on whether the aggregated probability is equal to or exceeds the predetermined threshold at least one of the particular one of the network-connected devices or an account associated with the particular one of the network-connected devices.

16. The system of claim 15, wherein the operations further comprise determining if at least some of content from the obtained content includes a watermark containing a device identification.

17. The system of claim 15, wherein the operations further comprise identifying at least one common characteristic for the at least some of the identified content, the common characteristic being one of an encoder, used for encoding the at least some of the identified content, a website for hosting the at least some of the identified content, or a private network for distributing the at least some of identified content.

18. The system of claim 15, wherein the operations further comprise:
determining whether the aggregated probability is above an aggregated suspicious threshold value; and
storing information related to the particular one of the network-connected devices in the database when the aggregated probability is above the aggregated suspicious threshold value.

19. A system for distributing content to user devices and for identifying from among network-connected devices a particular device likely associated with a potential theft of distributed content, the system comprising a processor configured to:
perform distributing operations comprising:
obtaining an identification associated with a network-connected device configured to receive a content;
generating a watermark reflecting the identification;
generating anti-collusion codes for the content;
providing the content by embedding in the content:
the watermark, wherein the watermark is not visually observable during playback of the content containing the watermark; and
the anti-collusion codes; and
perform identifying operations comprising:
obtaining content, the content having been distributed from a particular one of the network-connected devices;
determining whether at least some of content of the obtained content includes a watermark having a user device identification;
identifying in the obtained content a subset of the distributed content containing the anti-collusion codes;
calculating an aggregated probability for the particular one of the network-connected devices using the identified anti-collusion codes, the aggregated probability being based on a plurality of probabilities using the identified anti-collusion codes;
determining the particular one of the network-connected devices is associated with potential theft of distributed content using the calculated aggregated probability wherein each of the plurality of probabilities indicates a probability that the particular one of the network-connected devices is associated with potential theft of distributed content; and
blacklisting, based on whether the aggregated probability is equal to or exceeds the predetermined threshold at least one of the particular one of the network-connected devices or an account associated with the particular one of the network-connected devices.

20. The method of claim 12, wherein at least some information related to the particular one of the network-connected devices is removed from the database based on a time at which the information was added to the database.

* * * * *